United States Patent [19]

Doss et al.

[11] 4,060,519

[45] Nov. 29, 1977

[54] POLYTHIOL SEALANTS

[75] Inventors: Richard C. Doss; Timothy P. Murtha, both of Bartlesville, Okla.

[73] Assignee: Phillips Petroleum Company, Bartlesville, Okla.

[21] Appl. No.: 662,779

[22] Filed: Mar. 1, 1976

[51] Int. Cl.$^2$ .................. C08G 63/68; C08L 81/02
[52] U.S. Cl. .................... 260/79; 260/75 S; 260/79.1; 428/343; 428/344
[58] Field of Search .................. 260/75 S, 79, 33.6 R, 260/79.1; 428/343, 344

[56] References Cited

U.S. PATENT DOCUMENTS

| | | | |
|---|---|---|---|
| 3,455,854 | 7/1969 | Deltieure | 260/33.6 R |
| 3,717,617 | 2/1973 | Marrs et al. | 260/75 S |
| 3,798,192 | 3/1974 | Kenton | 260/75 S |
| 3,817,936 | 6/1974 | Jones et al. | 260/76 |
| 3,829,526 | 8/1974 | Doss et al. | 260/75 S |
| 3,849,381 | 11/1974 | Doss et al. | 260/75 S |

*Primary Examiner*—Ronald W. Griffin

[57] ABSTRACT

Naphthalene and alkylated naphthalenes are useful as sulfur-solubilizers in coating and sealant formulations based on polymercaptan-terminated polymers. In one embodiment, sealant and coating formulations are prepared by curing a mixture of (a) a polymercaptan-terminated polymer, (b) naphthalene or alkylated naphthalenes as sulfur-solubilizers containing dissolved sulfur, and (c) a curing agent.

14 Claims, No Drawings

POLYTHIOL SEALANTS

This invention relates to sealant and coating formulations containing polymercaptan-terminated polymers. In accordance with another aspect, this invention relates to the use of naphthalene and alkylated naphthalenes as solubilizers of elemental sulfur incorporated into sealant and coating formulations comprising polymercaptan-terminated polymers. In accordance with a further aspect, this invention relates to the preparation of sealant and coating compositions by curing a mixture comprising poly(oxyalkylene)-polyester-poly(monosulfide)-polythiol having an average of more than two mercapto groups per molecule, a minor amount of naphthalene or alkylated naphthalene containing dissolved sulfur, and a curing agent.

The incorporation of sulfur dissolved in napthalene or an alkylated naphthalene into a polymercaptan-terminated polymer, as defined, together with a curing agent produces cured sealants having highly elastomeric qualities.

Elemental sulfur is frequently an important ingredient in sealant and coating formulations, particularly those based on polymercaptans such as poly(oxyalkylene)-polyester-poly(monosulfide)-polythiol. Sulfur serves as a curing agent, cure modifier, adhesion promoter, etc. However, if elemental sulfur in powdered form is incorporated in the polymer, the polymer cures around the individual sulfur particles to produce imperfections which cause cured specimens of the polymer to fail. Therefore, it is important to dissolve the sulfur in a solvent prior to incorporating the sulfur into the polymer.

Although chlorinated polyphenyls can be used as solubilizers for sulfur, ecological considerations make it desirable that alternate solubilizers for sulfur be available. Many common plasticizers have been found to provide insufficient solubility for the sulfur at normal ambient temperature, e.g., at about 25° C, to be satisfactory as solubilizers for the sulfur. On the other hand, the solubility of sulfur in naphthalene and alkylated naphthalenes for use in this invention is quite adequate, and the compatibility or degree of miscibility of naphthalene or alkylated naphthalenes with the polymer is excellent.

Accordingly, it is an object of this invention to provide sealants based on polymercaptan-terminated polymers containing dissolved sulfur.

It is another object of this invention to provide a process for the production of improved sealant formulations.

It is another object of the invention to provide polymercaptan-terminated polymers curable to sealants and coatings having a desirable balance of properties.

Another object of the invention is to provide sulfur-solubilizers for incorporating sulfur into polymercaptan-terminated polymers.

Other objects, aspects, and the several advantages of the invention will be apparent to those skilled in the art upon a study of this disclosure and the appended claims.

In accordance with the invention, naphthalene and alkylated naphthalenes are used as sulfur-solubilizers for incorporating sulfur into polymercaptan-terminated polymers having an average of more than two mercapto groups per molecule.

Further, in accordance with the invention, curable sealant and coating compositions are provided comprising a poly(oxyalkylene)-polyester-poly(monosulfide)-polythiol having an average of more than two mercapto groups per molecule and at least one of naphthalene and alkylated naphthalenes as sulfur-solubilizers containing dissolved sulfur which is present in an amount sufficient to provide some curing of the polymer.

Further, in accordance with the invention, sealant and coating compositions are formed from a polymercaptan-terminated polymer, at least one of naphthalene and alkylated naphthalenes as sulfur-solubilizer containing dissolved sulfur, and additional curing agent present in an amount sufficient to convert at least 70 percent of the mercaptan to the polysulfide linkages.

Still further, in accordance with the invention, a process is provided for incorporating sulfur into polymercaptan-terminated polymers by using naphthalene and alkylated naphthalenes as sulfur-solubilizers.

Naphthalene or the alkylated naphthalenes for use in this invention include those of generic formula I and mixtures thereof.

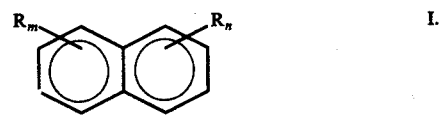

wherein the R groups are linear or branched alkyl groups containing from 1 to 10 carbon atoms per group and preferably from 1 to 6 carbon atoms per group and wherein $m$ and $n$ are, independently, zero or integers having the values of 1, 2, 3, or 4, with the further proviso that useful compounds of formula I generally contain from 10 to 30 and preferably 11 to 20 carbon atoms per molecule. Compounds of formula I which are most preferred are those which are normally liquid at room temperature. It will be understood from formula I that those positions on the aromatic nucleus which do not contain R groups will contain hydrogen atoms; e.g., when $m$ and $n$ are zero, formula I will represent naphthalene itself.

Examples of useful compounds of formula I include naphthalene, 1-methylnaphthalene, 2-methylnaphthalene, 1,2-dimethylnaphthalene, 1,4-dimethylnaphthalene, 1,3,6-trimethylnaphthalene, 1,2,3,4,5,6,7,8-octamethylnaphthalene, 1-methyl-4-n-butylnaphthalene, 6-isobutyl-2-methylnaphthalene, 2-methyl-7-n-butylnaphthalene, 3-ethyl-7-n-hexylnaphthalene, 2,6-di-n-decylnaphthalene, 1,4-dimethyl-7-isobutylnaphthalene, 1-methyl-3,6-di-n-butylnaphthalene, 2,6-dimethyl-4,8-di-n-butylnaphthalene, 3,7-diisobutyl-1,5-dimethylnaphthalene, 1-methyl-3-ethyl-6-isopropyl-8-n-hexylnaphthalene, and mixtures thereof.

The poly(oxyalkylene)-polyester-poly(monosulfide)-polythiols having an average of more than two mercaptan groups per molecule suitable for the present invention can be produced by reacting at least one mercaptoalkanoic acid and at least one thiodialkanoic acid with poly(oxyalkylene)-polyols having an average of more than two hydroxy groups per molecule.

The mercaptoalkanoic acids which can be used to prepare the poly(oxyalkylene)-polyester-poly(monosulfide)-polythiols can be represented by the formula $HS(CR_2)_nCOOH$, wherein each R is hydrogen or an alkyl radical having 1 to about 5 carbon atoms, with a total of not more than about 10 carbon atoms in all R groups per molecule; and wherein $n$ is an integer in the range of 1 to about 5. Examples of some mercaptoalkanoic acids which can be employed include mercaptoacetic acid, 3-mercaptopropionic acid, 2-mercaptopropionic acid, 4-mercaptobutyric acid, 3-isopropyl-5-mercaptovaleric acid, 2-propyl-3-mercaptoheptanoic acid, 3-pentyl-6-mercaptoundecanoic acid, and the like, and mixtures thereof.

The thiodialkanoic acids which can be employed in the production of the poly(oxyalkylene)-polyester-poly(monosulfide)-polythiols can be represented by the formula $HOOC(CR_2)_nS(CR_2)_nCOOH$, wherein R and n are as defined above, with a total of not more than about 20 carbon atoms in all R groups per molecule. Examples of suitable thiodialkanoic acids which can be used include thiodiacetic acid, 3,3'-thiodipropionic acid, 2,2'-thiodipropionic acid, 2,3'-thiodipropionic acid, 4,4'-thiodibutyric acid, 5,5'-thiobis(3-isopropylvaleric acid), 5,5'-thiobis(2-ethyl-3-tert-butylvaleric acid), 3,3'-thiobis(2-propylheptanoic acid), 6,6'-thiobis(3-pentylundecanoic acid), 4-carboxymethylthiovaleric acid, and the like, and mixtures thereof.

A particularly preferred procedure for reacting the mercaptoalkanoic acids and thiodialkanoic acids with the poly(oxyalkylene)-polyols is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acids with thiodialkanoic acids. The presently preferred procedure for preparing such mixtures of mercaptoalkanoic and thiodialkanoic acids is by hydrolyzing a mixture of mercaptonitriles and thiodinitriles which can be produced from alkenenitriles and hydrogen sulfide according to processes known to the art such as that described in U.S. Pat. No. 3,280,163. For example, according to a presently preferred procedure, acrylonitrile can be reacted with hydrogen sulfide in the presence of sulfur and a weak organic base to form a mixture consisting largely of 3-mercaptopropionitrile and 3,3'-thiodipropionitrile, containing minor amounts of other nitriles, which mixture can be subsequently hydrolyzed, without the necessity of separation, to form a suitable mixture of largely 3-mercaptopropionic acid and 3,3'-thiodipropionic acid, together with minor amounts of other carboxylic acids. Representative examples of nitriles that can be used are set forth in U.S. Pat. No. 3,280,163.

The poly(oxyalkylene)-polyols used in the preparation of the poly(oxyalkylene)-polyester-poly(monosulfide)-polythiols employed in this invention have an average of more than 2, preferably at least 2.5, hydroxy groups per molecule and molecular weights of from about 200 to about 20,000. These substances can be produced by the reaction of one or more epoxy-substituted hydrocarbons having the general formula:

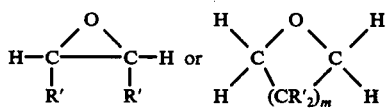

wherein each R' is hydrogen or an alkyl radical, the total number of carbon atoms per molecule being within the range of 2 to about 20, and m is an integer of from 1 to about 10, preferably 1 to 3, with a polyol having the formula $Y(OH)_x$, wherein Y is a hydrocarbon radical having at least 2, preferably 3 to about 40, carbon atoms, and a valence equal to the value of x, x is an integer of at least 2 and preferably 3 to about 12, and the number of carbon atoms per molecule of $Y(OH)_x$ is equal to or greater than x. Preferably Y is a saturated aliphatic, saturated cycloaliphatic, or aromatic radical, or combination thereof, having at least three hydroxy groups per molecule. Examples of some polyols which can be used include ethylene glycol, glycerol, 1,3-propanediol, erythritol, pentaerythritol, tris(hydroxymethyl)-1,5-pentanediol, 1,2,6-hexanetriol, 2-methyl-1,2,4,6,8,10-decanehexol, 1,2,4,6,7,9,12,14,15,17,19,20-eicosanedodecol, 1,2,40-tetracontanetriol, 4-cyclohexane-1,2-diol, 1,4-cyclohexanediol, 1,5,9-cyclododecanetriol, 1,2,3,4-cyclopentanetetrol, 2-methyl-1,3,5-cyclooctanetriol, 4-(1,2-dihydroxyethyl)cyclohexanol, resorcinol, phloroglucinol, 2,4,6-trihydroxytoluene, α,α-bis(p-hydroxyphenyl)benzyl alcohol, 1,4,5,8-naphthalenetetrol, and the like, and mixtures thereof. Examples of some epoxy-substituted hydrocarbons which can be used in the preparation of the poly(oxyalkylene)-polyols include 1,2-epoxyethane, 1,2-epoxypropane, 1,3-epoxypropane, 1,4-epoxybutane, 1,5-epoxypentane, 3-methyl-1,8-epoxyoctane, 4-octyl-1,12-epoxydodecane, 3-ethyl-5-isopropyl-1,10-epoxydecane, 2-butyl-1,6-epoxyhexane, 3-decyl-1,5-epoxypentane, 2-heptadecyl-1,3-epoxypropane, 1,2-epoxybutane, 2-methyl-3,4-epoxyheptane, 1,2-epoxyoctane, 2,3-epoxydodecane, 4-ethyl-1,2-epoxytetradecane, 1,2-epoxyeicosane, and the like, and mixtures thereof.

The poly(oxyalkylene)-polyols can be prepared by contacting at least one polyol of the formula $Y(OH)_x$, as defined above, with an epoxy-substituted hydrocarbon, as defined above, under suitable polymerization conditions, as is known to the art. For example, glycerol or 1,2,6-hexanetriol can be contacted with an excess of propylene oxide (1,2-epoxypropane) under elevated pressure and in the presence of suitable polymerization promoters. Products of this type can be obtained from commercial sources. In the preparation of poly(oxyalkylene)-polyols having an average of more than two hydroxy groups per molecule, mixtures of the above polyols such as at least one diol and another polyol of higher functionality can be reacted with the epoxy-substituted hydrocarbons defined above to form poly(oxyalkylene)-polyols having an average of more than two hydroxy groups per molecule. For instance, a mixture of 1,4-butanediol and 1,2,6-hexanetriol can be reacted with ethylene oxide to produce a poly(oxyethylene)-polyol having an average of more than two hydroxy groups per molecule. Alternatively, a poly(oxyalkylene)-polyol produced, e.g., by the reaction of a diol such as ethylene glycol with an alkylene oxide such as propylene oxide can be mixed with another poly(oxyalkylene)-polyol produced, e.g., by the reaction of a triol such as 1,2,6-hexanetriol with an alkylene oxide such as propylene oxide.

The mixtures of mercaptoalkanoic acids and thiodialkanoic acids can be reacted with the poly(oxyalkylene)-polyols to form poly(oxyalkylene)-polyester-poly(monosulfide)-polythiols by an esterification reaction which can be effected in any suitable equipment at temperatures preferably in the range of about 50° to about 250° C. Preferably the reaction is conducted in the presence of diluents that are substantially completely inert to the reactants and products under the reaction conditions employed. Such diluents can comprise as much as 95 weight percent of the components charged to the reactor. Acid esterification catalysts such as p-toluenesulfonic acid, benzenesulfonic acid, sulfuric acid, and the like can also be employed if desired to accelerate the rate of reaction. In that event, the diluents employed also should be inert to the acid catalyst. Examples of suitable diluents include toluene, benzene, xylene, cyclohexane, heptane, and the like, and mixtures thereof. The reaction pressure should be sufficient to prevent excessive loss of reactants and/or solvent at operating temperatures. Satisfactory pressures are normally within the range of about 0.5 to about 10 atmospheres. It is normally desirable to provide a means of removing water of reaction during the course of the esterification. This function can be accomplished by means known to the art, e.g., by azeotropic distillation. The properties of the poly(oxyalkylene)-polyester-poly(monosulfide)-polythiols will vary somewhat depending upon the reactants employed, the ratios of the various reactants, and other reaction conditions. Normally these polymers will be viscous liquid short-chain polymers, the chain length depending to considerable extent on the ratio of thiodialkanoic acid to mercaptoalkanoic acid used. In general, higher ratios of thiodialkanoic acid to mercaptoalkanoic acid yield longer polymer chains and a more viscous liquid or near solid product.

The esterification reaction should be effected to such an extent that at least about 80 percent of the hydroxy groups of the poly(oxyalkylene)-polyol are reacted with carboxy groups of the mercaptoalkanoic acid or thiodialkanoic acid to form ester groups. In general, in the range of about 0.8 to about 1.2 equivalents of hydroxy groups of the poly(oxyalkylene)-polyol should be employed for each equivalent of carboxy groups of the mercaptoalkanoic acid and thiodialkanoic acid. In general, an average of more than 2, preferably at least 2.5, ester groups are formed for each molecule of poly(oxyalkylene)-polyol. Following the esterification reaction, the poly(oxyalkylene)-polyester-poly(monosulfide)-polythiol product can be neutralized, e.g., with ammonium hydroxide, calcium hydroxide, or the like, prior to compounding into the desired sealant or coating formulation.

The amount of sulfur incorporated in the naphthalene or alkylated naphthalene solubilizer can vary over a considerable range and will be an amount sufficient to provide some curing of the polymer and promote adhesion of the resulting cured formulation. The amount of elemental sulfur in said solubilizer will generally be within the range of about 0.1 to about 4 weight percent and preferably from 0.5 to 2.5 weight percent based on the weight of said solubilizer plus sulfur. The amount of said solubilizer plus sulfur dissolved therein which is mixed with the poly(oxyalkylene)-polyester-poly(monosulfide)-polythiol should be sufficient to provide from about 0.004 to about 0.4 and preferably 0.01 to 0.1 part by weight sulfur per 100 parts by weight poly(oxyalkylene)-polyester-poly(monosulfide)-polythiol. Although the temperature at which the mixing is conducted is not critical, it is normally most convenient to mix the components at approximately room temperature.

Materials that can be employed together with the poly(oxyalkylene)-polyester-poly(monosulfide)-polythiol, naphthalene, or alkylated naphthalenes, and elemental sulfur in sealant and coating formulations include any material conventionally used as a nonelastomeric component of sealant and coating formulations, e.g., fillers, pigments, plasticizers, extenders, stabilizers, thickeners, other modifiers, and the like, such as calcium carbonate, titanium dioxide, silica, iron oxide, carbon black, dibutyl phthalate, hydrogenated polyphenyls, chlorinated hydrocarbons, alumina, zirconia, polyethylene, polystyrene, 2,2'-methylenebis(4-methyl-6-tert-butylphenol), and the like.

The order of addition of the nonelastomeric components is not critical although it is usually most convenient to add first to the poly(oxyalkylene)-polyester-poly(monosulfide)-polythiols the liquids or relatively low melting solids such as the naphthalene or alkylated naphthalenes containing dissolved sulfur, and any plasticizers or extenders, followed by solid components such as fillers and pigments, thickeners preferably being the last of the components to be added to constitute the premix. If desired, naphthalene or alkylated naphthalenes can be used as plasticizers or extenders. To the premix is added the curing agent, preferably along with or preceded by water to serve as a binder for the thickener, if employed in the premix, and an adhesion promoter, e.g., partially hydrolyzed gamma-glycidoxypropyltrimethoxysilane.

The blending of ingredients can be achieved by conventional methods such as hand mixing or machineblending the particular technique, depending in part upon available equipment and the requirements of the sealant or coating application problem.

The amount of poly(oxyalkylene)-polyester-poly(monosulfide)-polythiol present in the sealant or coating formulations containing nonelastomeric components will vary appreciably depending upon the desired final characteristics of the sealant or coating composition. However, in general, the amount of poly(oxyalkylene)-polyester-poly(monosulfide)-polythiol present in the sealant or coating formulation, excluding curing agent, will range from about 25 to 98 percent by weight, preferably being within the range of about 40 to about 80 percent by weight. The remainder can comprise nonelastomeric components in varying proportions depending upon the characteristics of the poly(oxyalkylene)-polyester-poly(monosulfide)-polythiol and the final composition desired.

The poly(oxyalkylene)-polyester-poly(monosulfide)-polythiols in the sealant or coating formulations of this invention can be cured with conventional curing agents including free oxygen-containing fluids such as, for example, air; peroxy compounds such as, for example, di-ter-butyl peroxide and cumene hydroperoxide; metal oxides such as, for example, the oxides of lead, zinc, manganese, calcium, barium, copper, mercury, tin, and iron; metal salts of carboxylic acids such as, for example, lead stearate, zinc laurate, and zinc acetate; ammonium and alkali metal chromates and persulfates; sulfur; and the like. The curing time will vary with the polymer, the curing agent, the sealant or coating formulation, and the temperature. In general, sufficient curing agent is employed to convert at least about 70 percent of the mercapto groups in the polymer to polysulfide linkages.

The sealant and coating formulations of this invention can be employed to join or coat various substrates. For example, substrates such as wood; plastics; glass; stone such as granite, marble, or the like; concrete; or metal such as aluminum, steel, iron, zinc, or the like can be joined or coated.

EXAMPLE I

The solubility of sulfur in several inventive and comparative (prior art) sulfur-solubilizers is demonstrated in this example.

Various amounts of elemental sulfur were dissolved in 15 gm of various agents by mixing at 130° C. After allowing the solutions to stand at room temperature for three days, the presence or absence of precipitated sulfur was observed. The results are tabulated in Table I.

TABLE I

| Run No. | Solubilizer | Wt. Sulfur/15 gm Solubilizer | | |
|---|---|---|---|---|
| | | 0.3 | 0.5 | 0.75 |
| 1 (Inv.) | 1-Methylnaphthalene | −[a] | − | +[b] |
| 2 (Inv.) | Methyl and dimethylnaphthalene mixture[c] | − | − | − |
| 3 (Inv.) | Butylated methylnaphthalene mixture[d] | − | − | + |
| 4 (Comp.) | Partially hydrogenated terphenyl[e] | − | − | + |
| 5 (Comp.) | Chlorinated polyphenyls[f] | − | + | + |

[a] − = absence of precipitated sulfur.
[b] + = presence of precipitated sulfur.
[c] = Crude mixture consisting of predominantly methylnaphthalenes (54 percent determined as area percent of total components eluting through a gas-liquid chromatograph) and dimethylnaphthalenes (17 area percent) from refinery stream. Balance contains lights and heavies.
[d] = Crude mixture consisting of approximately 40 weight percent butylmethylnaphthalenes, 28 wiehgt percent butyldimethylnaphthalenes, 19 weight percent dibutylmethylnaphthalenes, 5 weight percent dibutyldimethylnaphthalenes, and other higher molecular weight materials.
[e] = Available as HB-40 from Monsanto.
[f] = Mixture of monochlorinated biphenyl and polychlorinated terphenyl available as Aroclor 6062 from Monsanto.

The above data show that the alkylated naphthalenes of this invention (Runs 1 to 3) dissolve equal amounts of or more sulfur than prior art sulfur-solubilizers (Runs 4 and 5).

EXAMPLE II

The following example illustrates a sealant formulation based on a poly(oxyalkylene)-polyester-poly(-monosulfide)-polythiol employing the butylated methylnaphthalene mixture from Run 3 as sulfur-solubilizer.

Polyethermercaptopropionate prepared by reacting a mixture of 3-mercaptopropionic acid and thiodipropionic acid with a propylene oxide adduct of 1,2,6-hexanetriol as described in U.S. Pat. No. 3,817,936 and possessing 0.83 weight percent mercaptan groups, 0.19 acid number (mgKOH required to neutralize 1 gm of polymer), and viscosity at 25° C of 5,700 centipoise was employed in the following recipe (Table II):

TABLE II

| | Parts by Weight |
|---|---|
| Polymer | 40 |
| Butylated methylnaphthalene | 5.98 |
| Sulfur[a] | 0.02 |
| Silica | 2.4 |
| Titanium dioxide | 4 |
| Calcium Carbonate | 20 |
| 2,2'-methylenebis(4-methyl-6-t-butylphenol) | 0.4 |
| Carbon black | 0.24 |
| Yellow pigment | 0.3 |
| Iron oxide | 1.02 |

[a] Sulfur was dissolved in 0.98 parts by weight butylated methylnaphthalene prior to mixing in formulation.

The following curing system was added to the above pre-mix recipe:

TABLE II-A

| | Parts by Weight |
|---|---|
| Lead dioxide | 1.2 |
| Dibutylphthalate | 1.08 |
| Stearic acid | 0.12 |
| $H_2O$ | 0.88 |
| Partially hydrolyzed gamma-glycidoxypropyl-trimethoxysilane | 0.4 |

The above formulation, i.e., the total mixture (Tables II and II-A) of the pre-mix and curing system was poured into a mold and subjected to a temperature of 70° C for 24 hours. The resultant molded stock was a firm, cured elastomer, the properties of which are recorded in Table III.

TABLE III

| 50% Modulus, psi | 29.7 |
|---|---|
| 100% Modulus, psi | 37.6 |
| Tensile, psi | 92.5 |
| Elongation, % | 488 |

The above data are illustrative of the properties obtainable employing sealant formulations according to the present invention.

We claim:

1. Curable sealant and coating compositions comprising (a) a poly(oxyalkylene)-polyester-poly(monosulfide)-polythiol having an average of more than two mercapto groups per molecule and (b) at least one of naphthalene and alkylated naphthalenes as sulfur-solubilizers containing dissolved sulfur, the amount of sulfur present being sufficient to provide some curing in the polymer.

2. A composition according to claim 1 wherein (b) has the formula

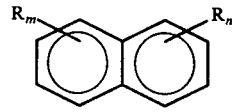

wherein the R groups are linear or branched alkyl groups containing 1 to 10 carbon atoms per group, $m$ and $n$ are, independently, zero or integers having the values of 1, 2, 3, or 4, with the further proviso that the compounds of the formula contain from 10 to 30 carbon atoms per molecule.

3. A composition according to claim 1 which contains (c) additional curing agent in an amount sufficient to convert at least 70 percent of the mercapto groups to polysulfide linkages.

4. A composition according to claim 3 which additionally contains nonelastomeric components selected from fillers, plasticizers, antioxidants, and adhesion promoters.

5. A composition according to claim 3 wherein the amount of (a) present ranges from about 25 to about 98 weight percent of the composition and the amount of (b) comprising solubilizer and sulfur is sufficient to provide from about 0.004 to about 0.4 part by weight sulfur per 100 parts by weight of (a).

6. A composition according to claim 5 which additionally contains nonelastomeric components selected from fillers, plasticizers, antioxidants, and adhesion promoters.

7. A composition according to claim 5 wherein (b) is 1-methylnaphthalene, a mixture of methyl and dimethylnaphthalenes, or a mixture of butylated methylnaphthalenes.

8. A composition according to claim 3 wherein the amount of (a) present ranges from about 40 to about 80 percent by weight of the composition, the amount of (b) comprising solubilizer and sulfur is sufficient to provide from about 0.01 to about 0.1 part by weight sulfur per 100 parts of (a), and the composition contains (c) additional curing agent in an amount sufficient to convert at least 70 percent of the mercapto groups to polysulfide linkages, and the composition additionally contains (d) nonelastomeric components selected from fillers, plasticizers, antioxidants, and adhesion promoters.

9. As an article of manufacture, a substrate coated on at least one surface thereof with the composition of claim 1.

10. An article according to claim 9 wherein said composition also contains (c) additional curing agent in an amount sufficient to convert at least 70 percent of the mercapto groups to polysulfide linkages, and (d) nonelastomeric components selected from fillers, plasticizers, antioxidants, and adhesion promoters.

11. A process for the production of sealant and coating formulations which process comprises incorporating into a poly(oxyalkylene)-polyester-poly(monosulfide)-polythiol having an average of more than two mercapto groups per molecule naphthalene or alkylated naphthalenes as sulfur-solubilizers containing dissolved sulfur, and an additional curing agent, the amount of sulfur present being sufficient to effect some curing of the polymer with the further proviso that the total amount of curing agent present being sufficient to convert at least 70 percent of the pendent thiol groups to polysulfide groups, and allowing the thus prepared formulation to cure and form sealant and coating compositions.

12. A process according to claim 11 wherein the curing agents are sulfur and lead dioxide and further wherein nonelastomeric components selected from fillers, plasticizers, antioxidants, and adhesion promoters are incorporated into the formulation.

13. A process according to claim 11 wherein (b) has the formula

wherein the R groups are linear or branched alkyl groups containing 1 to 10 carbon atoms per group, $m$ and $n$ are, independently, zero or integers having the values of 1, 2, 3, or 4, with the further proviso that the compounds of the formula contain from 10 to 30 carbon atoms per molecule.

14. A process according to claim 13 wherein (b) is 1-methylnaphthalene, a mixture of methyl and dimethylnaphthalenes, or a mixture of butylated methylnaphthalenes.

* * * * *